No. 737,648. PATENTED SEPT. 1, 1903.
E. C. MOURY.
BICYCLE SADDLE.
APPLICATION FILED JULY 5, 1901.
NO MODEL.
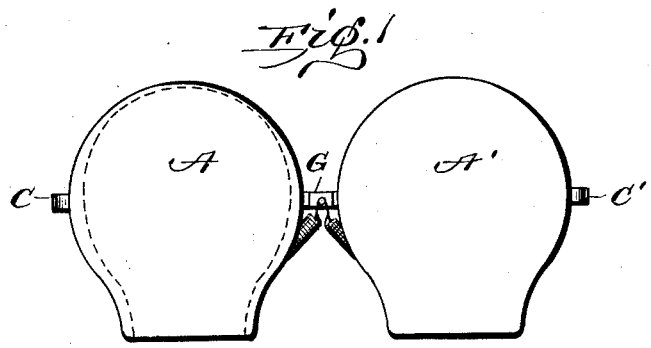
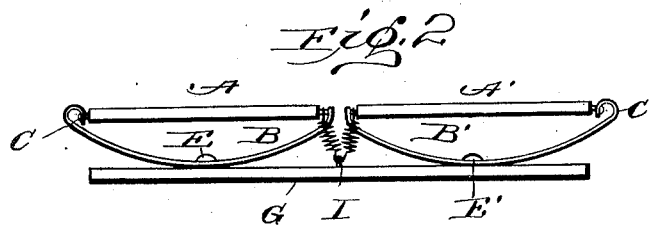

No. 737,648. Patented September 1, 1903.

UNITED STATES PATENT OFFICE.

EDWIN CARY MOURY, OF DEGRAFF, OHIO.

BICYCLE-SADDLE.

SPECIFICATION forming part of Letters Patent No. 737,648, dated September 1, 1903.

Application filed July 5, 1901. Serial No. 67,245. (No model.)

*To all whom it may concern:*

Be it known that I, EDWIN CARY MOURY, a citizen of the United States, residing at Degraff, in the county of Logan and State of Ohio, have invented a new and useful Improvement in Bicycle-Saddles, of which the following is a specification.

My invention relates to improvements in bicycle-saddles in which the saddle is composed of two parts, each part having universal yielding movement and each part being independent of the other in its movements.

Figure 1 is a top view; Fig. 2, an end or front view.

In the drawings, A A' are separate saddles, pivoted on springs B B', that are themselves pivoted at E E' to the spring-bar G. The springs B B' are bent or curved upward at their inner ends D, while the outer ends are bent upward and curved over and downward at C. The saddles are also connected in front of the center by a coiled spring H, that is depressed in its center and held by hook I on the bar G. The outer ends of springs B B' are curved upward, inward, and downward to allow the spring to yield inward and downward instead of outward and downward, so that the saddle will cling or fit itself to the shape of the limb. My saddles A A' are made of rubber, leather, or other strong and flexible material, and each is clamped in a frame nearly horseshoe-shaped, as shown in dotted lines in seat A, with heavy rigid side pieces and a thinner flexible band connecting them at the back. The front of the frame is open and covered by the leather or rubber seat, thus allowing flexibility to the seat at front and back.

It will be seen that by this construction and arrangement each saddle has a universal adjustment to adapt itself to any and every position and movement of the body. The saddles are free to tilt forward or backward, and each can swing laterally on its pivot independent of the other, while by the yielding of springs B B' and the flexible nature of the frame and saddle proper each saddle adjusts itself to the body and conforms to the shape of the limb.

The spring H keeps the two saddles parallel when not in use and tilted downward in front in position for mounting, besides assisting to return them to normal position. These springs may be nearly vertical, as shown in Fig. 2, or extend forwardly, as in Fig. 1, which latter form is preferred.

What I claim is—

In a bicycle-saddle the two parts or seats A, A', the flexible frames pivoted at C, D, at each side, the curved springs B, the pivots E, E' and a supporting-bar G, as and for the purpose set forth.

EDWIN CARY MOURY.

Witnesses:
HARRIETT A. CAMPBELL,
HENRY ARBEGAST.